INVENTOR
TATSUO GOTO
BY: Paul M. Craig, Jr.
ATTORNEY

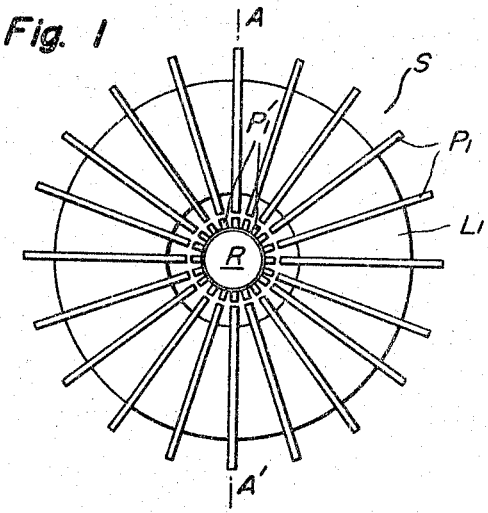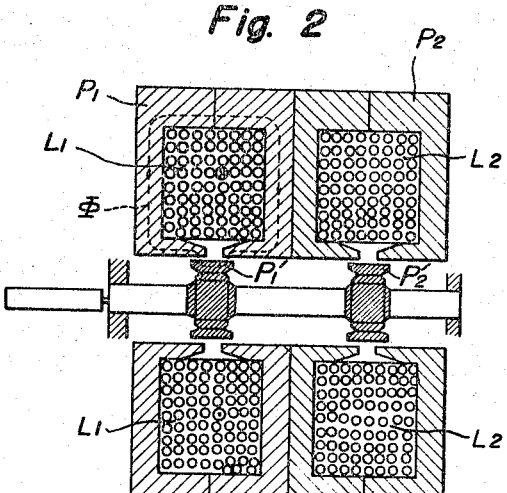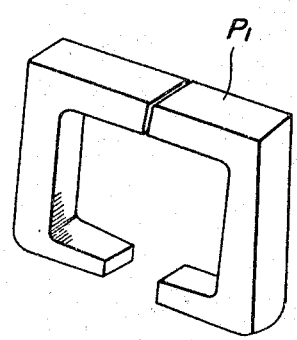

United States Patent Office 3,327,191
Patented June 20, 1967

3,327,191
TWO-PHASE REVERSIBLE STEP MOTOR
Tatsuo Goto, Tokyo, Japan, assignor to Hitachi, Ltd.,
Tokyo, Japan, a corporation of Japan
Filed July 29, 1963, Ser. No. 298,137
7 Claims. (Cl. 318—138)

This invention relates to step motors for use in the numerical control of machine tools and like applications.

For use in such numerical control, step motors are generally required to be able to rotate exactly through an angle desired in both forward and reverse directions and have a high torque ratio to the inertia of the rotor so that it may respond exactly even to high frequency input pulses. It has previously been supposed, however, that high speed reversible step motors of such kind must involve three or more phases. The present invention is intended to provide a two-phase reversible step motor adapted for such purpose which is compact in size, light in weight, operable at high speeds, stable in operation and includes a simplified driving circuit.

According to the present invention, there is provided a two-phase reversible step motor which comprises a stator carrying a first and a second group of stator poles and a rotor carrying a first and a second group of rotor poles, the said first groups of stator and rotor poles and the said second groups of stator and rotor poles cooperating to form the first and second phases, respectively, one of the said second groups of stator and rotor poles being arranged offset relative to the said first groups of stator and rotor poles by an angle of $\pi/n$ (radian), $n$ representing the number of poles in each of said groups of stator and rotor poles, so that the torques produced in the respective phases when the two groups of stator poles are both excited are in balance acting in opposite directions and that the exciting coils for the two stator pole groups are alternately rendered nonexciting by an input pulse train.

According to another feature of the present invention, there is provided a driving logical circuit for a two-phase reversible step motor of the kind described comprising pulse input terminals for rotation of the motor rotor in forward and reverse directions, respectively, gate means for distributing an input pulse train alternately to two normally energized exciting coils of the motor, and delay circuit means for delaying the application of pulses arriving from the said gate means for reset purposes, the arrangement being such that the exciting coils are alternately rendered nonexciting each time a pulse arrives and that whenever the pulse input is switched between the said input terminals the order of pulse distribution to the said exciting coils is reversed.

The foregoing and other objects, features and advantages of the invention will become apparent from the following description when taken in conjunction with the accompanying drawings, in which:

FIG. 1 is an end view of a motor embodying the present invention;

FIG. 2 is a sectional view taken along the line A'—A' in FIG. 1;

FIG. 3 is a perspective view of a pair of stator cores;

Figure 5:
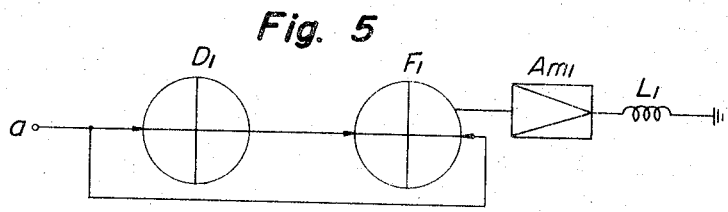
Figure 6:
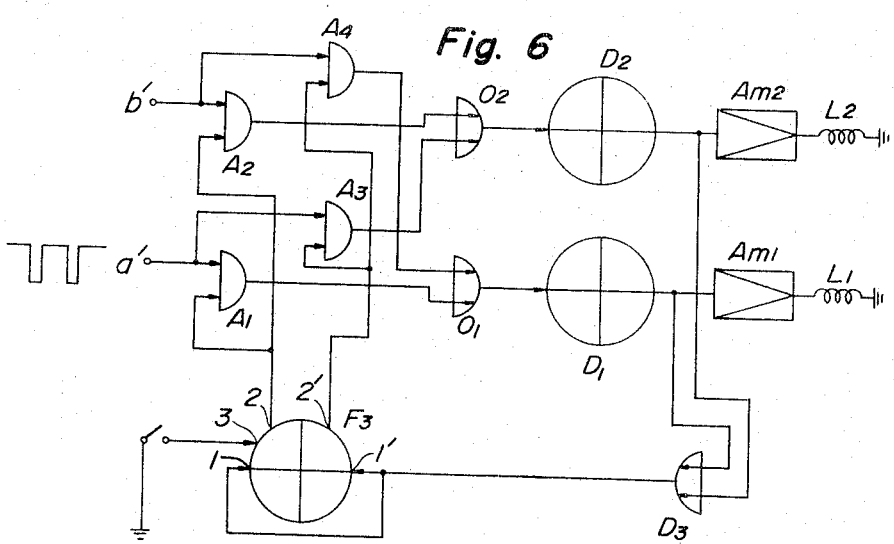
Figure 7:
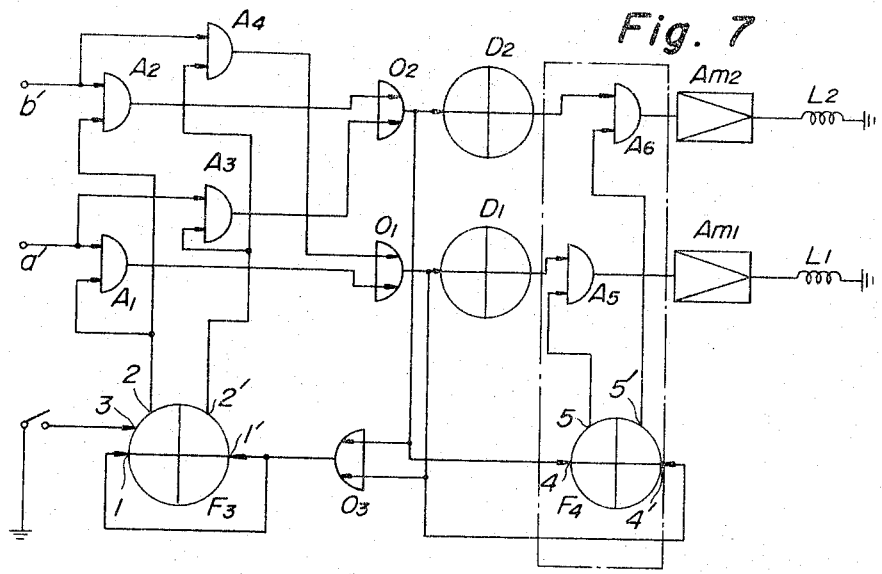
Figure 8:
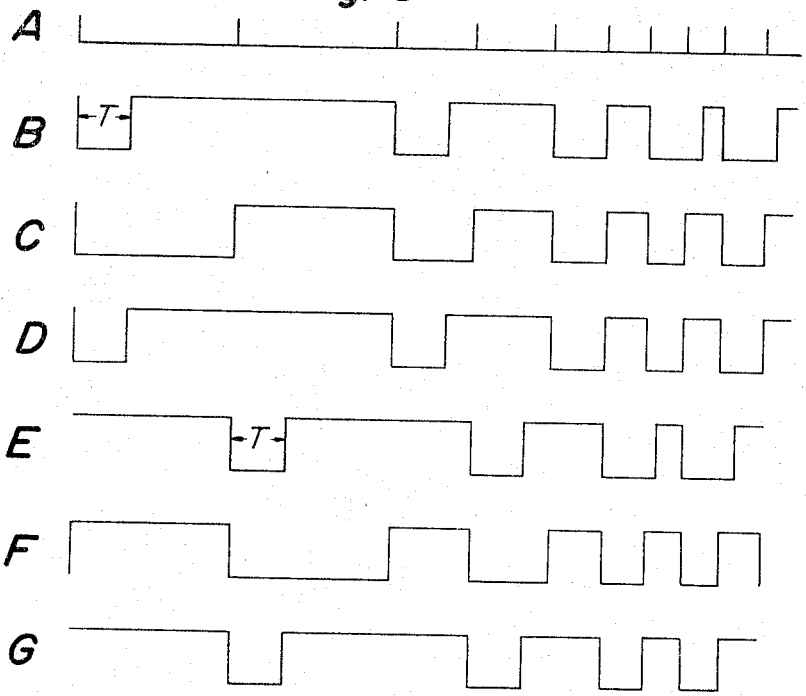

FIGS. 5 to 7, inclusive, represent circuit diagrams of several forms of driving logical circuit; and FIG. 8 illustrates the pulse waveforms at respective points in the circuit shown in FIG. 7.

Referring to the drawings, particularly to FIGS. 1 and 2, which illustrate one embodiment of the present invention, the stator S includes a first group of stator poles $P_1$ arranged thereon radially at regular angular intervals.

(The number of poles $P_1$ will be represented by $n$ hereinafter.) A common annular exciting winding or coil $L_1$ is wound through the pole group. The stator poles $P_1$ each include two U-shaped iron cores joined together, as seen in FIG. 3. The U-shaped iron cores are arranged symmetrically in a plane so that the U-shaped recesses cooperate to embrace the toroidal exciting coil $L_1$, which may be prepared by any convenient method. The rotor R carries a first group of rotor poles $P_1'$, $n$ in number, arranged at regular angular intervals corresponding to said first group of stator poles $P_1$. Reference characters $P_2$ and $P_2'$ designate a second group of stator poles and a second group of rotor poles similarly arranged on the stator S and the rotor R, respectively. A common annular exciting winding or coil $L_2$ is wound through the second group of stator poles $P_2$ as is the case of the first group of stator poles $P_1$. For example, when a current flows through the annular exciting coil $L_1$ in a direction as indicated in FIG. 2, with the current flowing into the conductors shown on the upper half of $L_1$ and out of the conductors in the lower half of $L_1$. As a result the first group of stator poles $P_1$ is magnetized as indicated to pull the first group of rotor poles $P_1'$. The dotted line indicates the path of the magnetic flux in this case.

The pole groups described above are arranged relative to each other in a manner such that either said second group of stator poles $P_2$ or said second group of rotor poles $P_2'$, both pole groups cooperating to form the second phase, is arranged offset or shifted by an angle of $\pi/n$ (radian) relative to the first stator pole group $P_1$ and the first rotor pole group $P_1'$ cooperating to form the first phase. For example, as illustrated in FIG. 4A, when the first stator pole group $P_1$ and the second stator pole group $P_2$ are in alignment with each other, the first rotor pole group $P_1'$ and the second rotor pole group $P_2'$ are shifted relative to each other by $\pi/n$ (radian). Similarly, when the first rotor pole group $P_1'$ and the second rotor pole group $P_2'$ are in alignment with each other, the first group of stator poles $P_1$ and the second stator pole group $P_2$ are shifted relative to each other by $\pi/n$.

Figure 4:
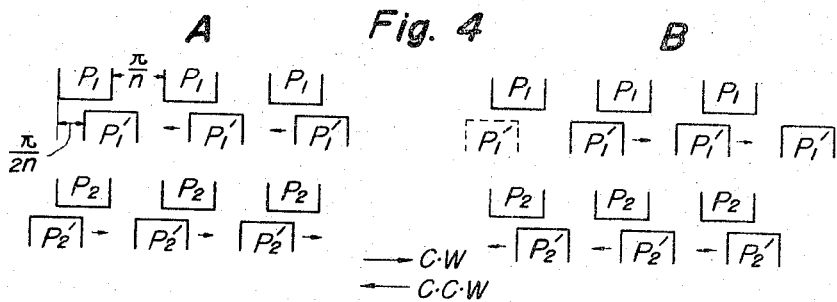
FIG. 4 is a diagrammatic development illustrating the relative postion of the stator and the rotor poles.

Referring next to FIG. 5, which illustrates one form of logical circuit required for reversible rotation of the step motor constructed as described above, reference characters $a$ and $b$ designate pulse input terminals, $D_1$ and $D_2$ delay circuits, $F_1$ and $F_2$ bistable circuits, $Am_1$ and $Am_2$ amplifiers, and $L_1$ and $L_2$ annular exciting coils wound through respective stator pole groups $P_1$ and $P_2$. The coils $L_1$ and $L_2$ are both normally in an energized or ON state under control of the respective bistable circuits $F_1$ and $F_2$. In this case, assuming that the pole groups are positioned as shown in FIG. 4A, the first stator pole group $P_1$ is excited so as to drive the rotor R in a counterclockwise direction while the second stator pole group $P_2$ is excited so as to drive the rotor in a clockwise direction. Accordingly, in the normal state a clockwise and a counterclockwise torque are produced to balance with each other. In FIGURE 5, conventional one shot multivibrators, for example, are used as the delay circuits $D_1$ and $D_2$. Such a one shot multivibrator generates output pulses after signals are applied to its input terminal with a certain delay which is determined by the circuit parameters. Each of the bistable circuits $F_1$ and $F_2$ is a conventional bistable multivibrator element, which reverses its state in acccordance with input pulses applied to its input terminals, and generates at its output terminal either an on-signal or an off-signal, alternatively, depending upon which of its two stable states it is in. The amplifiers $Am_1$ and $Am_2$ are connected to the output terminals of the bistable circuits $F_1$ and $F_2$, respectively, in a manner such that the outputs of the bistable circuits are applied directly to the amplifiers $Am_1$ and $Am_2$ respectively. Further, the outputs of the amplifier $Am_1$ and $Am_2$ are applied to the exciting coils $L_1$ and $L_2$ respectively. This may be achieved in a conventional manner such as shown in FIGURE 4 of U.S. Patent 3,124,732 wherein the amplifiers 119, 129, 139 and 149 serve to energize windings 310, 320, 330 and 340, respectively. Applicants' arrangement differs however, from that of Patent 3,124,732 in that the windings $L_1$ and $L_2$ of applicant's circuit are normally energized by an enabling potentnial generated by the bistable circuits $F_1$ and $F_2$ at their output terminals, but the rotor of the two phase motor does not rotate. This is due to the fact that groups of poles of the motor of this invention are arranged in the relation shown in FIGURE 4A and the counter-clockwise driving force for the pole $P_1'$ produced by mutual action of the magnetic flux through $P_1$ and $P_1'$, is counterbalanced by the clockwise driving force for the pole $P_2'$ produced by mutual action of the magnetic flux through $P_2$ and $P_2'$. Hence, the counter-clockwise driving force is offset by the clockwise driving force and the rotor remains at rest.

Upon a control signal input pulse being applied to the terminal $a$ with the motor rotor at rest as described above, the input signal pulse is applied both directly to one input terminal of bistable circuit $F_1$, and through delay circuit $D_1$ to the remaining input terminal of bistable circuit $F_1$. The directly applied input pulse causes the bistable circuit to be switched from it "on" to its "off" condition. Subsequently, the input pulse applied to the terminal $a$ which enters the delay circuit $D_1$, is then applied to the remaining input terminal $F_1$ after a certain time delay. Then the output of $F_1$ is again reversed to its "on" condition. There is no input to the amplifier $Am_1$ during the period that $F_1$ is "off," and accordingly, no current flows through $L_1$.

As described above, when an input pulse is applied to the terminal $a$ then $L_1$ becomes non-excited for a certain period determined by the delay circuit $D_1$. Accordingly the counter-clockwise driving force for $P_1'$ is zero for a predetermined period after a pulse is applied to the terminal $a$, so that the rotor is allowed to rotate in a clockwise direction. When the rotor is rotated to the position as shown in FIGURE 4B, the output of $F_1$ reverses again to "on" due to the delayed pulse being applied to its remaining input terminal. Upon this occurrence current again flows through $L_1$, thereby balancing the counter-clockwise driving force with the clockwise driving force and the rotor stops its rotation.

Subsequently, when a command pulse enters the other input terminal $b$, the annular exciting coil $L_2$ is rendered nonexciting. On this occasion, as illustrated in FIG. 4B, the stator pole group is positioned relative to the rotor pole group contrariwise to the relationship shown in FIG. 4A in both the first and second phases. Accordingly, the rotor R is subjected to torque forces relationed contrariwise to each other, that is, the first rotor pole group is subject to a clockwise torque and the second rotor pole group is subject to a clockwise torque and the second rotor pole group to an anticlockwise torque. Therefore, when the annular exciting coil $L_2$ is rendered nonexciting for a certain period of time by the pulse applied to the terminal $b$, the anticlockwise torque is again reduced to zero allowing the rotor R to rotate clockwise until the first group of rotor poles is positioned as illustrated in FIG. 4A and the bistable circuit $F_2$ again reset by a pulse delayed by the delay circuit $D_2$, when the opposing torques are balanced to cease the rotation of the rotor R. As apparent from the foregoing, the rotor R will continue to rotate stepwise in a clockwise direction as command pulses are applied alternately to the input terminals $a$ and $b$. Similarly, if with the pole groups initially positioned as shown in FIG. 4A the bistable circuit $F_2$ is reset and then after a suitable time lapse is set by a pulse passing through the delay circuit $D_2$, the rotor will continue to rotate stepwise this time in an anticlockwise direction as the bistable circuits $F_1$ and $F_2$ are alternately held in a reset state for a predetermined period of time.

FIG. 6 illustrates a further refinement of the driving logical circuit for use with the apparatus of the present invention. With this refined circuit, continuous rotation of the motor is obtainable by continuously applying pulses to one input terminal to alternately render the exciting coils nonexciting for a predetermined period of time.

In FIG. 6, input terminals $a'$ and $b'$ are provided to receive pulses for driving the rotor clockwise and anticlockwise, respectively. Reference characters $A_1$, $A_2$, $A_3$ and $A_4$ designate respective AND-gate circuits, $O_1$ and $O_2$ OR-gate circuits, $D_1$ and $D_2$ delay circuits, and $Am_1$, $Am_2$ amplifier circuits. $O_3$ indicates a further OR-gate circuit, $F_3$ a bistable circuit, 1 and 1' input terminals of the bistable circuit $F_3$, 2 and 2' its output terminals, and 3 a reset terminal for establishing an initial state. It is to be understood that common annular exciting windings $L_1$ and $L_2$ are wound through respective stator pole groups $P_1$ and $P_2$, as shown in FIGS. 1 and 2.

In operation, initially the bistable circuit $F_3$ is reset by the reset terminal 3, and a signal appears at the output terminal 2, such that AND-gate circuits $A_1$ and $A_2$ are open with $A_3$ and $A_4$ closed. In this state with the delay circuits $D_1$ and $D_2$ both held in a reset condition, the annular exciting coils $L_1$ and $L_2$ are energized through the amplifier circuits $Am_1$ and $Am_2$. Under these circumstances, a pulse signal entering one of the input terminals $a'$ passes through AND gate $A_1$ to set the delay circuit $D_1$ and renders the exciting coil $L_1$ nonexciting for a preset period of time. At the same time, the bistable circuits $F_3$ is reversed by the pulse passing through the OR gate $O_3$ to allow the signal to appear at the other output terminal $2'$. Thus, AND-gate circuits $A_3$ and $A_4$ are opened and $A_1$, $A_2$ closed. Under this condition, an input pulse entering the input terminal $a'$ will pass the AND gate $A_3$ to set the delay circuit $D_2$ thereby to render the exciting coil $L_2$ nonexciting for a period of time as determined by the delay circuit $D_2$. As is the case described above, the pulse passes through the OR gate $O_3$ to reverse the state of the bistable circuit $F_3$. Thus, if pulses enter one of the input terminals $a'$ in succession, the exciting coils $L_1$ and $L_2$ are alternately rendered nonexciting for a predetermined period of time and the rotor continues to rotate stepwise in a clockwise direction. Similarly, in case successive pulses enter the other input terminal $b'$, initially the exciting coil $L_2$ is rendered nonexciting and then the exciting coils $L_1$ and $L_2$ are alternately rendered nonexciting to cause the rotor R to rotate contrariwise in an anticlockwise direction. It will be apparent that the direction of rotation of the rotor can be reversed from clockwise to anticlockwise simply by switching the pulse input from $a'$ to $b'$, and the reversal from anticlockwise to clockwise can be effected by the switching from $b'$ to $a'$.

FIG. 7 illustrates a further form of a driving logical circuit comprising a part of the inventive apparatus, which is adapted to improve response of the apparatus to input pulses of higher frequencies. The circuit shown in FIGURES 5 or 6 cannot respond properly if the time intervals between succeeding input control pulses is shorter than the delay time of the delay circuits $D_1$ and $D_2$. In FIGURE 6, for example, when two pulses are applied successively to the terminal $a'$, $L_1$ must be in the state of non-excitation at first, and then $L_2$ must be in the state of non-excitation. If the time interval between two successive pulses is shorter than the delay time of the delay circuit, then the second pulse will reach $F_3$ before $F_3$ is reversed by the first impulse, thus two pulses will be applied to $D_1$ successively, causing miss-operation of the circuit.

The embodiment illustrated in FIGURE 7 is to provide a driving circuit which is operable by input signals with shorter time intervals than delay time of the delay circuit. For this purpose two AND-gate circuits $A_5$ and $A_6$ are inserted between $D_1$; $D_2$ and $Am_1$, $Am_2$, respectively, and also a bistable circuit $F_4$ is connected between $D_1$, $D_2$ and $Am_1$, $Am_2$ of FIGURE 6. Other reference characters designate parts equivalent to those in FIG. 5 carrying like references.

Operation of the circuit of FIG. 7 will now be described. Assuming that a pulse train as illustrated in FIG. 8a enters one of the input terminal $a'$ of the circuit, the output of the delay circuits $D_1$ and $D_2$ includes a train of pulses having a predetermined time interval $T$ therebetween as shown in FIG. 8b and 8e, respectively. On the other hand, pulses passing through OR gates $O_1$ and $O_2$ each act to reverse the bistable circuit $F_4$ and thus the ouput at its output terminal 5 and 5' varies between the forms shown in FIGS. 8c and 8f each time a pulse from OR gate $O_1$ or $O_2$ enters the bistable circuit $F_4$. Accordingly, the output of one of the AND gates $A_5$, which has a pulse input as shown in FIG. 8b and 8c, will have a waveform as shown in FIG. 8d while the output of the other AND gate $A_6$, which has a pulse input as shown in FIG. 8e and 8f, will have a waveform as shown in FIG. 8g. The pulse trains of FIGS. 8d and 8g are fed to the above-described exciting coils $L_1$ and $L_2$, respectively, to render the coils nonexciting for respective time intervals. It follows, therefore, that when the pulses in the train have larger intervals, the delay time of the delay circuits $D_1$ and $D_2$ determines the time interval when the exciting coils $L_1$ and $L_2$ are nonexciting, but as the pulse interval of the input train is reduced the pulse width of the output of the AND gates $A_5$ and $A_6$ is also reduced. As seen from FIGURE 8, when time intervals between successive input pulses are shorter than the time delay of the delay circuits, (namely, such pulses as 6th, 7th, 8th and 9th from left hand side of FIGURE 8a if these pulses are applied successively, currents will be supplied to $L_1$ and $L_2$ alternatively, because as seen from FIGURE 8, corresponding wave forms of FIGURE 8d and FIGURE 8g are "on" alternatively. Thus, this circuit is theoretically responsive to a frequency as high as $2/T$ p.p.s.

It will be apparent from the foregoing that the step motor of the present invention is inexpensive and compact in size as compared with previous three-phase motors and that its shaft can be reduced in length and hence in bending deflection so as to minimize the air gap thereby to increase the motor torque. Also, the motor shaft can also be reduced in diameter and in number of rotors carried thereby. This results in a further advantage that the motor giving a large torque for its size is rapid to respond while allowing use of an extremely simplified driving circuit. For example, a step motor adapted for stepwise rotation of nine degrees a step and employing a driving logical circuit as shown in FIG. 7, has exhibited highly improved characteristics such as a maximum operation frequency of 1000 p.p.s. or over and a starting frequency of 500 p.p.s. The step motor according to the invention has a further important feature that it never involves the so-called hunting phenomenon and a response with no oscillation involved can be obtained by properly adjusting the switching time $T$ of the delay circuits.

It is to be understood that the invention is not to be limited to the details set forth herein but many changes and modifications may be made without departing from the spirit and scope of the invention. For example, the direction of each magnetic flux path and the arrangement of the pole groups may be altered in various ways with the magnetic poles in each phase arranged relative to each other as described herein. Also, it will be apparent that the distributing circuit of FIG. 6 including bistable circuit $F_3$ and gates $A_1$, $A_2$, $A_3$ and $A_4$ may be replaced by a mechanical commutator device adapted to serve the same purpose. A commutator may also be used to detect two points of balance as illustrated in FIGS. 4A and 4B, respectively, to automatize the resetting of the bistable circuit $F_3$. It is therefor to be understood that such changes may be made in the subject invention without departing from the spirit and scope of the invention as defined by the appended claims.

What is claimed is:

1. A two-phase reversible step motor comprising a rotor having shaft and a first group of rotor poles and a second group of rotor poles arranged radially on said rotor shaft, a stator comprising a first exciting coil wound surrounding said first group of rotor poles in the direction perpendicular to said rotor shaft, a second exciting coil wound surrounding said second group of rotor poles in the direction perpendicular to said rotor shaft, a first group of stator poles and a second group of stator poles arranged to face said first group of rotor poles and said second group of rotor poles, respectively, to form first and second sets of poles, respectively, said first and second group of stator poles being formed to surround said first and second exciting coils, respectively, either the group of stator poles or the group of rotor poles in one of said first and second sets of stator and rotor poles being displaced by $\pi/n$ radians with repect to the corresponding group of poles in the remaining set of stator and rotor poles where $n$ is the number of poles in each of said sets of stator and rotor poles, driving circuit means for normally energizing both of said exciting coils when no control input pulses are applied thereto and including control pulse input means having a forward control signal input terminal and a reverse control signal input terminal for selectively de-energizing one of said exciting coils for a predetermined period of time upon a control input pulse being applied thereto, said one coil being again normally energized upon termination of the predetermined period of time.

2. A two-phase reversible step motor according to claim 1, wherein said driving circuit means comprises a forward control signal input terminal and a reverse control signal input terminal, said forward and reverse input terminals being connected to respective associated forward or reverse delay circuit means each having the output thereof coupled to one input terminal of a respective forward or reverse bistable multivibrator circuit means, said forward and reverse bistable multivibrator means each having a remaining input terminal connected directly to its respective forward or reverse control signal input terminal, the output of the forward multivibrator means being coupled to control energization of the first exciting coil and the output of the reverse bistable multivibrator means being coupled to control energization of the second exciting coil.

3. A two-phase reversible step motor according to claim 1, wherein said driving circuit means comprises a forward control signal input terminal and a reverse control signal input terminal, first, second, third and fourth AND circuits, said first and third AND circuits having one input terminal connected to said forward input terminal and said second and fourth AND circuits having one input terminal connected to said reverse input terminal, first and second OR circuits, said first OR circuit having input terminals coupled to the outputs of said first and fourth AND circuits, respectively, and said second OR circuit having input terminals coupled to the outputs of said second and third AND circuits, respectively, a forward delay circuit means having its input coupled to the output of said first OR circuit and having the output thereof controlling energization of said first exciting coil, a reverse delay circuit means having its input coupled to the output of said second OR circuit and having the output thereof controlling energization of said second exciting coil, a third OR circuit having input terminals coupled to the outputs of said forward and reverse delay circuit means, respectively, bistable multivibrator circuit means having two trigger input terminals coupled to the output of said third OR circuit, said bistable multivibrator means having a first output terminal coupled to remaining input terminals of said first and second AND circuits, respectively, and having a second output terminal coupled to remaining input terminals of said third and fourth AND circuits, respectively, and means for setting said bistable multivibrator means to an initial starting condition wherein an output signal appears across the first output terminal thereof.

4. A two-phase reversible step motor according to claim 3, wherein the third OR circuit has its inputs connected to the outputs of the first and second OR circuits, respectively, and wherein the driving circuit means is further characterized by fifth and sixth AND circuits and a second bistable multivibrator means, the fifth AND circuit having one of its input terminals coupled to the output of the forward delay circuit means which controls energization of the first exciting coil and having a remaining input terminal coupled to a first output of the second bistable multivibrator means, the sixth AND circuit having one of its input terminals coupled to the output of the reverse delay circuit means which controls energization of the second exciting coil, and having a remaining input terminal coupled to a remaining output terminal of the second bistable multivibrator means, the second bistable multivibrator means having first and second trigger input terminals coupled to the outputs of the first and second OR circuits, respectively.

5. A driving logical circuit for a two-phase reversible step motor comprising a forward control signal input terminal and a reverse control signal input terminal, said forward and reverse input terminals being connected to respective associated forward or reverse delay circuit means each having the output thereof coupled to one input terminal of a respective forward or reverse bistable multivibrator circuit means, said forward and reverse bistable multivibrator means each having a remaining input terminal connected directly to its respective forward or reverse control signal input terminal, the output of the forward multivibrator means being coupled to control energization of one of the phases of a two-phase reversible step motor, and the reverse bistable multivibrator means being coupled to control energization of the remaining phase thereof.

6. A driving logical circuit for a two-phase reversible step motor comprising a forward control signal input terminal and a reverse control signal input terminal, first, second, third, and fourth AND circuits, said first and third AND circuits having one input terminal connected to said forward input terminal and said second and fourth AND circuits having one input terminal connected to said reverse input terminal, first and second OR circuits, said first OR circuit having input terminals coupled to the outputs of said first and fourth AND circuits, respectively, and said second OR circuit having input terminals coupled to the outputs of said second and third AND circuits, respectively, a forward delay circuit means having its input coupled to the output of said first OR circuit and having the output thereof controlling energization of one of the phases of a two-phase reversible step motor, a reverse delay circuit means having its input coupled to the output of said second OR circuit and having the output thereof controlling energization of the remaining phase of the two-phase reversible step motor, a third OR circuit having input terminals coupled to the outputs of said forward and reverse delay circuit means, respectively, bistable multivibrator circuit means having two trigger input terminals coupled to the output of said third OR circuit, said bistable multivibrator means having a first output terminal coupled to remaining input terminals of said first and second AND circuits, respectively, and having a second output terminal coupled to remaining input terminals of said third and fourth AND circuits, respectively, and means for setting said bistable multivibrator means to an initial starting condition wherein an output signal appears across the first output terminal thereof.

7. The driving logical circuit for a two-phase reversible step motor according to claim 6, wherein the third OR circuit has its inputs connected to the outputs of the first and second OR circuits, respectively, and wherein the driving circuit means is further characterized by fifth and sixth AND circuits and a second bistable multivibrator means, the fifth AND circuit having one of its input terminals coupled to the output of the forward delay circuit means which controls energization of one of the phases of a two-phase reversible step motor, and having a remaining input terminal coupled to a first output of the second bistable multivibrator means, the sixth AND circuit having one of its input terminals coupled to the output of the reverse delay circuit means which controls energization of the remaining phase of the two-phase reversible step motor and having a remaining input terminal coupled to a remaining output terminal of the second bistable multivibrator means, the second bistable multivibrator means having first and second trigger input terminals coupled to the outputs of the first and second OR circuits, respectively.

References Cited
UNITED STATES PATENTS

| | | | |
|---|---|---|---|
| 3,005,118 | 10/1961 | Ranseen | 310—49 |
| 3,042,818 | 7/1962 | Busch | 310—49 |
| 3,119,941 | 1/1964 | Guiot | 310—49 |
| 3,124,732 | 3/1964 | Dupy | 318—138 |
| 3,204,136 | 8/1965 | Kiawa et al. | 218—138 X |

ORIS L. RADER, *Primary Examiner.*

G. Z. RUBINSON, *Assistant Examiner.*